US008899179B1

(12) United States Patent
Carter et al.

(10) Patent No.: US 8,899,179 B1
(45) Date of Patent: Dec. 2, 2014

(54) CORD GRIPPING BIRD FEEDER LID FOR EASY OPERATION

(75) Inventors: James Carter, Denver, CO (US); Bryan Krueger, Denver, CO (US); Lynn Hunter, Parker, CO (US)

(73) Assignee: Classic Brands, LLC, Denver, CO (US)

( * ) Notice: Subject to any disclaimer, the term of this patent is extended or adjusted under 35 U.S.C. 154(b) by 0 days.

(21) Appl. No.: 13/420,086

(22) Filed: Mar. 14, 2012

Related U.S. Application Data

(60) Provisional application No. 61/452,626, filed on Mar. 14, 2011.

(51) Int. Cl.
*A01K 1/10* (2006.01)
(52) U.S. Cl.
USPC ........................................................ 119/57.8
(58) Field of Classification Search
USPC .............. 119/51.01, 51.03, 51.12, 52.1, 52.2, 119/52.3, 52.4, 56.1, 57.8, 57.9, 428, 429, 119/459, 464; D30/124, 125, 126, 127, 128
See application file for complete search history.

(56) References Cited

U.S. PATENT DOCUMENTS

| 117,807 A | 8/1871 | Orndoff |
|---|---|---|
| D8,908 S | 1/1876 | Wiley |
| 632,167 A | 8/1899 | Biesmeyer |
| 727,597 A | 5/1903 | Day |
| 813,954 A | 2/1906 | Davis |
| D43,781 S | 4/1913 | Sanford |
| 1,251,935 A | 1/1918 | Stevens |
| 1,558,316 A | 10/1925 | Tipple |
| 1,634,569 A | 7/1927 | Bray |
| D81,602 S | 7/1930 | Teague |
| 1,791,956 A | 2/1931 | Cowles |
| D87,460 S | 8/1932 | Cook |
| 1,891,042 A | 12/1932 | Benoit |
| D115,321 S | 6/1939 | Pueschel |
| 2,350,922 A | 6/1944 | Planeta |
| 2,417,178 A | 3/1947 | Ritter |
| D153,759 S | 5/1949 | Blatt |
| 2,510,721 A | 6/1950 | Smith |
| D170,150 S | 8/1953 | Kowap |
| D173,658 S | 12/1954 | Jones |
| 2,696,803 A | 12/1954 | Deffenbaugh |
| D174,139 S | 3/1955 | Sadler |
| 2,725,663 A | 12/1955 | Mullen |

(Continued)

OTHER PUBLICATIONS

Final Office Action, U.S. Appl. No. 13/107,841, mailed Jan. 9, 2013, 22 pages.

(Continued)

*Primary Examiner* — Rob Swiatek
*Assistant Examiner* — Ebony Evans
(74) *Attorney, Agent, or Firm* — Polsinelli PC

(57) ABSTRACT

A bird feeder with a movable lid includes a knob which is grippable by the user of the bird feeder to slide the lid along a suspending cable. The knob includes a U-shaped spring with gripping surfaces that grip the cable. This U-shaped spring is firmly trapped between the knob and the upper surfaces of the lid. This assembly permits easy sliding of the lid against the frictional engagement provided by spring bias so that the lid is held down against the filler opening of the feed reservoir that, but can be slid along the cable against the frictional bias of the spring for easy filling.

20 Claims, 6 Drawing Sheets

(56) References Cited

U.S. PATENT DOCUMENTS

| | | |
|---|---|---|
| D178,917 S | 10/1956 | England et al. |
| 2,786,446 A | 3/1957 | Newman |
| 2,804,844 A | 9/1957 | Gigliotti |
| 2,887,987 A | 5/1959 | Fitzgerald et al. |
| 2,891,508 A | 6/1959 | Bower |
| 2,944,516 A | 7/1960 | Malloy, Sr. |
| 2,971,671 A | 2/1961 | Shakman |
| 2,987,041 A | 6/1961 | Bard |
| 3,022,768 A | 2/1962 | Lynch |
| 3,051,126 A | 8/1962 | Merritt et al. |
| 3,051,303 A | 8/1962 | Daanen |
| D193,558 S | 9/1962 | Parry |
| 3,090,354 A | 5/1963 | Merritt et al. |
| 3,136,296 A | 6/1964 | Luin |
| 3,145,690 A | 8/1964 | Bachman |
| D200,778 S | 4/1965 | Pregont |
| 3,307,602 A | 3/1967 | Boster |
| 3,316,884 A | 5/1967 | Viggars |
| 3,372,676 A | 3/1968 | Williams |
| D216,361 S | 12/1969 | Pappas, Jr. |
| D217,470 S | 5/1970 | Morrow |
| 3,526,335 A | 9/1970 | Swett et al. |
| D230,948 S | 3/1974 | Moon |
| D234,180 S | 1/1975 | Dart et al. |
| 3,901,192 A | 8/1975 | Adams |
| 3,977,363 A | 8/1976 | Fisher, Jr. |
| D241,860 S | 10/1976 | Calamia |
| D244,786 S | 6/1977 | Dryden |
| 4,030,451 A | 6/1977 | Miller |
| D245,349 S | 8/1977 | Fisher, Jr. |
| D245,643 S | 8/1977 | Orfei |
| D245,927 S | 9/1977 | Edwards et al. |
| D248,006 S | 5/1978 | Christian |
| 4,144,842 A | 3/1979 | Schlising |
| 4,188,913 A | 2/1980 | Earl et al. |
| 4,201,155 A | 5/1980 | Hyde, Jr. |
| 4,223,637 A | 9/1980 | Keefe |
| D258,338 S | 2/1981 | Gersin |
| D260,843 S | 9/1981 | Laird et al. |
| 4,327,669 A | 5/1982 | Blasbalg |
| 4,328,605 A * | 5/1982 | Hutchison et al. .......... 24/115 G |
| 4,331,104 A | 5/1982 | Clarke |
| D266,611 S | 10/1982 | Metts et al. |
| D267,355 S | 12/1982 | Blasbalg |
| D268,056 S | 2/1983 | Campbell-Kelly et al. |
| 4,389,975 A | 6/1983 | Fisher, Jr. |
| D272,507 S | 2/1984 | Conti |
| D272,508 S | 2/1984 | Conti |
| 4,444,324 A | 4/1984 | Grenell |
| D274,563 S | 7/1984 | Blasbalg |
| D277,514 S | 2/1985 | Bescherer |
| D278,751 S | 5/1985 | Seager |
| D282,019 S | 12/1985 | Kilham |
| D284,033 S | 5/1986 | Brodsky |
| D285,840 S | 9/1986 | Poon |
| D289,143 S | 4/1987 | Guillaume |
| D289,210 S | 4/1987 | Tucker et al. |
| D289,211 S | 4/1987 | Riha |
| 4,664,066 A | 5/1987 | Steuernagel et al. |
| D290,769 S | 7/1987 | Taylor |
| D290,773 S | 7/1987 | Liethen |
| D292,372 S | 10/1987 | Sykes |
| 4,712,512 A | 12/1987 | Schrieb et al. |
| 4,732,112 A | 3/1988 | Fenner et al. |
| 4,798,172 A | 1/1989 | Clarke |
| D299,770 S | 2/1989 | Coffer |
| 4,821,681 A | 4/1989 | Tucker |
| 4,896,628 A | 1/1990 | Kadunce |
| 4,901,673 A | 2/1990 | Overstreet |
| 4,938,168 A | 7/1990 | Meidell |
| D309,858 S | 8/1990 | Meyersburg |
| 4,974,547 A | 12/1990 | Graham |
| 4,986,219 A | 1/1991 | Harris |
| 4,996,947 A | 3/1991 | Petrides |
| 5,033,411 A | 7/1991 | Brucker |
| D324,436 S | 3/1992 | Embree |
| 5,105,765 A | 4/1992 | Loken |
| D326,003 S | 5/1992 | Embree |
| 5,140,945 A | 8/1992 | Barnhart et al. |
| D329,892 S | 9/1992 | Brister |
| 5,168,830 A | 12/1992 | Deglis |
| 5,191,857 A | 3/1993 | Boaz |
| D334,635 S | 4/1993 | Wenstrand |
| D335,006 S | 4/1993 | Blasbalg |
| 5,207,180 A | 5/1993 | Graham |
| D337,271 S | 7/1993 | Pezzoli et al. |
| D338,317 S | 8/1993 | Woodward |
| 5,247,904 A | 9/1993 | Anderson |
| 5,255,631 A | 10/1993 | Anderson |
| 5,269,242 A | 12/1993 | Toldi |
| D343,030 S | 1/1994 | Harwick, Jr. |
| 5,289,796 A | 3/1994 | Armstrong |
| 5,291,855 A | 3/1994 | Laverty |
| D351,691 S | 10/1994 | Lipton |
| D351,692 S | 10/1994 | Cossey |
| 5,361,723 A | 11/1994 | Burleigh |
| D360,495 S | 7/1995 | Sanderson |
| D360,829 S | 8/1995 | Leeds |
| D366,413 S | 1/1996 | Tober |
| 5,479,879 A | 1/1996 | Biek |
| D370,313 S | 5/1996 | Nottingham et al. |
| D371,230 S | 6/1996 | Nottingham et al. |
| D371,979 S | 7/1996 | Nottingham et al. |
| 5,533,467 A | 7/1996 | Lancia |
| 5,558,040 A | 9/1996 | Colwell et al. |
| D376,731 S | 12/1996 | Lin |
| D380,066 S | 6/1997 | Green et al. |
| 5,655,477 A | 8/1997 | Hoffman et al. |
| D383,878 S | 9/1997 | Merino et al. |
| D386,835 S | 11/1997 | Passamare |
| D386,836 S | 11/1997 | Hunt |
| 5,682,835 A | 11/1997 | Walter et al. |
| 5,701,841 A | 12/1997 | Fasino |
| 5,711,247 A | 1/1998 | Henshaw |
| 5,775,256 A | 7/1998 | Henshaw |
| 5,782,200 A | 7/1998 | Knowles et al. |
| D397,529 S | 8/1998 | Fuller et al. |
| D399,611 S | 10/1998 | Ericson et al. |
| 5,829,382 A | 11/1998 | Garrison |
| D406,307 S | 3/1999 | Kang |
| D408,420 S | 4/1999 | Buter |
| 5,947,054 A | 9/1999 | Liethen |
| D425,259 S | 5/2000 | Lang |
| 6,079,361 A | 6/2000 | Bowell et al. |
| D428,437 S | 7/2000 | Hmelar et al. |
| D428,537 S | 7/2000 | Miller |
| 6,095,087 A | 8/2000 | Bloedorn |
| 6,119,627 A | 9/2000 | Banyas et al. |
| D431,760 S | 10/2000 | Sullivan |
| D433,633 S | 11/2000 | La Fata |
| 6,145,477 A | 11/2000 | Jansen |
| D434,980 S | 12/2000 | Suziki |
| D440,361 S | 4/2001 | Colwell |
| 6,213,054 B1 | 4/2001 | Marshall |
| 6,253,706 B1 | 7/2001 | Sloop |
| 6,253,707 B1 | 7/2001 | Cote |
| D448,290 S | 9/2001 | Schultz et al. |
| 6,305,321 B1 | 10/2001 | Potente |
| D451,251 S | 11/2001 | Chrisco et al. |
| 6,360,690 B1 | 3/2002 | Canby |
| 6,415,737 B2 | 7/2002 | Banyas et al. |
| 6,418,878 B1 | 7/2002 | Cathell et al. |
| D461,827 S | 8/2002 | Koebbe |
| 6,427,629 B1 | 8/2002 | Lush |
| 6,450,120 B1 | 9/2002 | Nylen |
| D466,255 S | 11/2002 | Kuelbs |
| D466,656 S | 12/2002 | Kuelbs et al. |
| D470,630 S | 2/2003 | Kuelbs |
| D471,327 S | 3/2003 | Kuelbs |
| 6,543,383 B1 | 4/2003 | Cote |
| 6,543,384 B2 | 4/2003 | Cote |
| 6,546,894 B2 | 4/2003 | Chrisco et al. |
| 6,561,128 B1 | 5/2003 | Carter |
| 6,584,933 B1 | 7/2003 | Stone |

(56) References Cited

U.S. PATENT DOCUMENTS

| | | |
|---|---|---|
| 6,591,781 B2 | 7/2003 | Hardison |
| D478,475 S | 8/2003 | Backes et al. |
| 6,622,654 B2 | 9/2003 | Fasino |
| 6,659,041 B1 | 12/2003 | Curts |
| D485,930 S | 1/2004 | Chen |
| 6,701,867 B1 | 3/2004 | Garrison |
| D490,576 S | 5/2004 | Rich et al. |
| D491,019 S | 6/2004 | Marsden et al. |
| D493,053 S | 7/2004 | Snell |
| D495,900 S | 9/2004 | Mayse |
| 6,789,916 B2 | 9/2004 | Ruggles |
| 6,792,891 B1 | 9/2004 | Coburn et al. |
| D497,226 S | 10/2004 | Nauert |
| D497,406 S | 10/2004 | King |
| D497,458 S | 10/2004 | Nauert |
| 6,830,009 B1 | 12/2004 | Kuelbs |
| D503,019 S | 3/2005 | Swift et al. |
| 6,866,004 B1 | 3/2005 | Lush |
| D504,547 S | 4/2005 | Nauert |
| D504,746 S | 5/2005 | Lee |
| D505,521 S | 5/2005 | Schrodt |
| D505,755 S | 5/2005 | Lundstrom et al. |
| 6,895,894 B2 | 5/2005 | Fort, II |
| 6,901,882 B2 | 6/2005 | Kuelbs |
| 6,945,192 B2 | 9/2005 | Cote |
| D511,866 S | 11/2005 | Lundstrom et al. |
| D512,800 S | 12/2005 | Jung et al. |
| 6,986,322 B2 | 1/2006 | Lumpkin et al. |
| D515,748 S | 2/2006 | Jung et al. |
| D515,916 S | 2/2006 | Bleuer |
| 7,017,517 B2 | 3/2006 | Paquette |
| 7,017,521 B2 | 3/2006 | Kuelbs |
| D518,380 S | 4/2006 | Moran |
| 7,021,241 B2 | 4/2006 | Nock |
| 7,032,538 B1 | 4/2006 | Lush |
| D523,141 S | 6/2006 | Massey |
| D524,490 S | 7/2006 | Obenshain |
| 7,096,821 B2 | 8/2006 | Ruff |
| 7,168,392 B2 | 1/2007 | Kuelbs |
| 7,185,605 B1 | 3/2007 | Lush |
| 7,191,731 B2 | 3/2007 | Cote |
| D540,349 S | 4/2007 | Waki |
| D542,659 S | 5/2007 | Meether et al. |
| D543,256 S | 5/2007 | Chen |
| D544,942 S | 6/2007 | Chen |
| 7,234,416 B2 | 6/2007 | Hoff |
| D548,587 S | 8/2007 | DuVal et al. |
| 7,258,075 B1 | 8/2007 | Jones et al. |
| 7,287,486 B2 | 10/2007 | Hunter |
| D556,568 S | 12/2007 | DuVal |
| D561,021 S | 2/2008 | DuVal et al. |
| D561,040 S | 2/2008 | Sequeira |
| 7,347,162 B2 | 3/2008 | Zieff et al. |
| D567,098 S | 4/2008 | Sequeira |
| D568,754 S | 5/2008 | Sequeira |
| 7,370,607 B2 | 5/2008 | O'Dell |
| 7,373,901 B2 | 5/2008 | Baynard |
| D575,118 S | 8/2008 | Bignon |
| D575,591 S | 8/2008 | Bonetti |
| 7,409,922 B1 | 8/2008 | Baynard et al. |
| 7,448,346 B1 | 11/2008 | Stone et al. |
| 7,484,475 B2 | 2/2009 | Milliner |
| 7,503,282 B1 | 3/2009 | Lush |
| 7,506,611 B1 | 3/2009 | Lush |
| D591,589 S | 5/2009 | Myers et al. |
| D592,046 S | 5/2009 | Myers et al. |
| 7,530,330 B1 | 5/2009 | Valle |
| 7,540,260 B2 | 6/2009 | Rich et al. |
| 7,540,262 B2 | 6/2009 | Kuelbs |
| 7,549,394 B2 | 6/2009 | Nock |
| D596,033 S | 7/2009 | Zach et al. |
| D599,159 S | 9/2009 | Stein |
| 7,610,875 B2 | 11/2009 | Webber |
| D606,447 S | 12/2009 | West et al. |
| D607,612 S | 1/2010 | Yang |
| D609,864 S | 2/2010 | Tsai |
| 7,654,225 B2 | 2/2010 | Madsen et al. |
| 7,669,553 B2 | 3/2010 | White et al. |
| 7,726,259 B2 | 6/2010 | Hepp et al. |
| 7,739,982 B2 | 6/2010 | Cote |
| 7,743,732 B2 | 6/2010 | Webber |
| D623,805 S | 9/2010 | Vosbikian |
| 7,798,099 B2 | 9/2010 | Vosbikian |
| 7,874,264 B2 | 1/2011 | McMullen |
| D636,238 S | 4/2011 | Elmelund |
| 7,930,994 B2 | 4/2011 | Stone et al. |
| D638,588 S | 5/2011 | Vosbikian |
| 7,958,845 B2 | 6/2011 | Gardner |
| D643,442 S | 8/2011 | Sato et al. |
| D643,855 S | 8/2011 | Taniguchi et al. |
| 7,997,434 B2 | 8/2011 | Benetti |
| 8,006,642 B2 | 8/2011 | Vosbikian |
| D649,299 S | 11/2011 | Lush |
| D649,302 S | 11/2011 | Hickok |
| D652,059 S | 1/2012 | Sato et al. |
| D656,690 S | 3/2012 | Tu |
| D657,399 S | 4/2012 | Nemoto |
| 8,156,894 B1 | 4/2012 | Krah |
| D658,684 S | 5/2012 | Roman |
| D664,437 S | 7/2012 | Barel |
| 8,230,809 B2 | 7/2012 | Cote |
| 8,245,666 B2 | 8/2012 | Sena et al. |
| 8,276,541 B2 | 10/2012 | LoRocco et al. |
| D671,276 S | 11/2012 | Krueger |
| D671,277 S | 11/2012 | Vosbikian et al. |
| D671,692 S | 11/2012 | Carter |
| 8,347,818 B2 | 1/2013 | Cowger et al. |
| D676,614 S | 2/2013 | Fields et al. |
| D677,016 S | 2/2013 | Carter |
| D678,625 S | 3/2013 | Krueger |
| 8,413,605 B2 | 4/2013 | Baynard et al. |
| 2003/0033985 A1 | 2/2003 | Hardison |
| 2003/0136347 A1 | 7/2003 | Fasino |
| 2003/0226514 A1 | 12/2003 | Cote |
| 2004/0231606 A1 | 11/2004 | Nock |
| 2004/0250777 A1 | 12/2004 | Stachowiak |
| 2004/0261726 A1 | 12/2004 | Lumpkin |
| 2005/0120967 A1 | 6/2005 | Ruff |
| 2005/0257749 A1 | 11/2005 | Kuelbs |
| 2005/0263085 A1 | 12/2005 | Rich |
| 2006/0272585 A1 | 12/2006 | O'Dell |
| 2007/0034160 A1 | 2/2007 | Nock |
| 2007/0163506 A1 | 7/2007 | Bloedorn |
| 2007/0227454 A1 | 10/2007 | Fahey |
| 2007/0266951 A1 | 11/2007 | Berns |
| 2008/0022936 A1 | 1/2008 | Stone et al. |
| 2008/0105206 A1 | 5/2008 | Rich et al. |
| 2008/0127902 A1 | 6/2008 | Bent N. et al. |
| 2008/0134979 A1 | 6/2008 | Crocker |
| 2008/0210172 A1 | 9/2008 | Waikas |
| 2008/0302304 A1 | 12/2008 | Mayfield |
| 2009/0071408 A1 | 3/2009 | Wechsler |
| 2009/0223456 A1 | 9/2009 | Hunter et al. |
| 2009/0260576 A1 | 10/2009 | Vosbikian |
| 2009/0304900 A1 | 12/2009 | Augustin |
| 2010/0061091 A1 | 3/2010 | Galipeau et al. |
| 2010/0089330 A1 | 4/2010 | McMullen |
| 2010/0258054 A1 | 10/2010 | Frazier |
| 2010/0288200 A1 | 11/2010 | Lush |
| 2011/0067637 A1 | 3/2011 | Baynard |
| 2011/0073043 A1 | 3/2011 | Dault |
| 2011/0088626 A1* | 4/2011 | Hepp et al. .......... 119/52.4 |
| 2011/0180004 A1 | 7/2011 | Humphries et al. |
| 2012/0055410 A1 | 3/2012 | Cote |

OTHER PUBLICATIONS

Notice of Allowance, U.S. Appl. No. 29/416,886, mailed Jan. 10, 2013, 15 pages.

Notice of Allowance, U.S. Appl. No. 29/416,887, mailed Dec. 26, 2012, 15 pages.

Notice of Allowance, U.S. Appl. No. 29/416,890, mailed Dec. 20, 2012, 24 pages.

(56) References Cited

OTHER PUBLICATIONS

Ex Parte Quayle Action, U.S. Appl. No. 29/437,624, mailed Jun. 7, 2013, 23 pages.
Response to Final Office Action, U.S. Appl. No. 13/107,841, filed Jul. 8, 2013, 10 pages.
U.S. Appl. No. 29/387,517, filed Mar. 14, 2011, Krueger.
U.S. Appl. No. 29/387,518, filed Mar. 14, 2011, Krueger et al.
U.S. Appl. No. 13/107,841, filed May 13, 2011, Donegan et al.
U.S. Appl. No. 13/420,063, filed Mar. 14, 2012, Carter et al.
U.S. Appl. No. 29/416,886, filed Mar. 28, 2012, Carter.
U.S. Appl. No. 29/416,887, filed Mar. 28, 2012, Carter.
U.S. Appl. No. 29/437,619, filed Nov. 19, 2012, Krueger.
U.S. Appl. No. 29/437,624, filed Nov. 19, 2012, Krueger.
Restriction Requirement, Design U.S. Appl. No. 29/387,517, mailed Oct. 12, 2011, 4 pages.
Response to Restriction, Design U.S. Appl. No. 29/387,517, filed Dec. 12, 2011, 2 pages.
Non-Final Office Action, Design U.S. Appl. No. 29/387,517, mailed Mar. 12, 2012, 7 pages.
Response to Non-Final Office Action, Design U.S. Appl. No. 29/387,517, filed Jun. 12, 2012, 13 pages.
Non-Final Office Action, Design U.S. Appl. No. 13/107,841, mailed Jun. 27, 2012, 9 pages.
Notice of Allowance, Design U.S. Appl. No. 29/387,517, mailed Jul. 3, 2012, 11 pages.
Restriction Requirement, Design U.S. Appl. No. 29/416,890, filed Aug. 4, 2012, 5 pages.
Response to Restriction Requirement, Design U.S. Appl. No. 29/416,890, filed Sep. 4, 2012, 13 pages.
Response to Non-Final Office Action, U.S, Appl. No. 13/107,841, filed Nov. 27, 2012, 21 pages.
U.S. Appl. No. 13/901,321, filed May 23, 2013, Carter et al.
U.S. Appl. No. 29/438,289, filed Nov. 28, 2012, Bruno et al.
U.S. Appl. No. 29/438,291, filed Nov. 28, 2012, Bruno et al.
U.S. Appl. No. 29,448,176, filed Mar. 11, 2013, Carter.
Notice of Allowance, U.S. Appl. No. 29/437,624, mailed Sep. 18, 2013, 23 pages.
Non-Final Office Action, U.S. Appl. No. 13/107,841, mailed Aug. 19, 2013, 20 pages.
Non-Final Office Action, U.S. Appl. No. 13/855,565, mailed Sep. 27, 2013, 32 pages.
Non-Final Office Action, U.S. Appl. No. 13/855,523, mailed Sep. 30, 2013, 29 pages.
*Ex Parte Quayle* Action, U.S. Appl. No. 29/437,619, mailed Nov. 27, 2013, 22 pages.
Restriction Requirement, Design U.S. Appl. No. 29/438,289, mailed Dec. 20, 2013, 24 pages.
Response to *Ex Parte Quayle* Action, U.S. Appl. No. 29/437,619, filed Jan. 27, 2014, 15 pages.
Notice of Allowance, U.S. Appl. No. 29/437,619, mailed Feb. 14, 2014, 19 pages.
Response to Restriction Requirement, Design U.S. Appl. No. 29/438,289, filed Jan. 21, 2014, 2 pages.
*Ex Parte Quayle* Action, Design U.S. Appl. No. 29/438,289, mailed Mar. 6, 2014, 11 pages.
Response to Non-Final Office Action, U.S. Appl. No. 13/855,523, filed Jan. 27, 2014, 6 pages.
Response to Non-Final Office Action, U.S. Appl. No. 13/855,565, filed Jan. 27, 2014, 6 pages.

\* cited by examiner

CORD GRIPPING BIRD FEEDER LID FOR EASY OPERATION

CROSS REFERENCE TO RELATED APPLICATION

The present application incorporates in its entirety and claims the benefit under 35 U.S.C. §119(e) of: U.S. Provisional Application 61/452,626 filed 14 Mar. 2011 and titled Cord Gripping Bird Feeder Lid for Easy Operation.

BACKGROUND

This disclosure relates to bird feeders for feeding wild birds. Such bird feeders are usually hung from a hook or tree limb. The particular type of wild bird feeder discussed herein hangs with the use of a thin but strong cable which has a loop at one end and is attached at the other end to the bird feeder itself.

One such prior feeder has a feed reservoir and a lid which rests on top of the reservoir. The lid can be removed from the reservoir for refilling the reservoir with bird feed, usually seeds. In one particular instance this lid has a hole through the center and a finial attached to this hole. The finial has a hole through which the cable passes. The finial has a passage or barrel at right angles to the cable that holds a spring-biased plunger. The end of the plunger has a hole and the cable passes through the hole. The plunger's hole is normally forced by the biasing spring against and frictionally binds the cable against the finial. The plunger must be depressed to relieve this binding so that the lid can be slid along the cable toward and away from the feed reservoir.

In another prior bird feeding device, a bolt threads against the cable passing through a vertical hole in the lid. The bolt presses against the cable to lock the lid in position along the cable.

Both of these prior solution require a substantial manual dexterity to depress the plunger or to operate the laterally mounted bolt.

Accordingly it is an object of the disclosed device to provide a simple, dependable mechanism that can be easily operated with gloved hands that permits the lid of the bird feeder to be held down against the feed reservoir, or to be slid upwardly on the cable and thus out of the way to permit feed within the reservoir to be replenished.

It is another object to be invented to provide a knob and lid combination that grips the cable but that can be slid along the cable without manipulation of a bolt or plunger.

SUMMARY

To this end, disclosed is a bird feeder and a hanging cable with a lid that normally lies over and closes the opening into the feed reservoir of the bird feeder. This lid has an enlarged knob at its center through which the hanging cable passes. Within the lid and knob combination, a spring, sized and biased to grip the cable, engages the cable and prevent the lid and knob combination from freely sliding along the length of the cable, but the person gripping the knob can apply enough force to overcome the frictional engagement of the spring against the cable and thus slide the lid and knob along the cable from an engaged position over the feed reservoir to a deployed position away from the opening to the feed reservoir.

DETAILED DESCRIPTION

Figure 1:
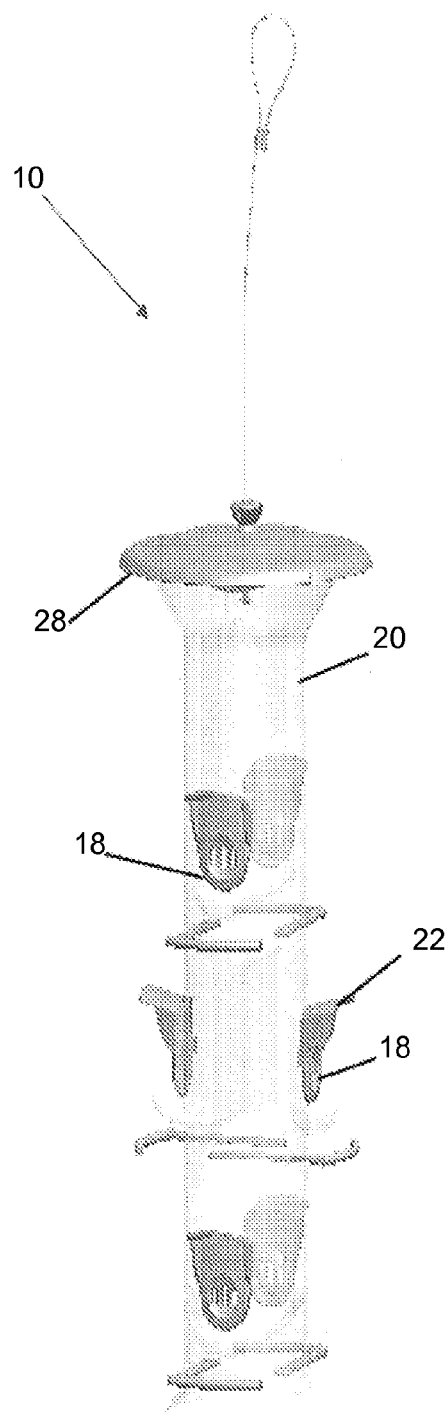
FIG. 1 is an overall perspective view of one execution of our bird feeder.

The bird feeder 10 of the preferred embodiment consists of the generally vertical cylindrically shaped feed reservoir 20. This feed reservoir has several, in this case six, feed stations at which wild birds can access the feed within the feed reservoir 20 through openings 18. These feeding stations consist of a perch, a feed cup to receive a feed that may spill from the opening 18 through the side of the tubular feed reservoir and a slidable shutter 22 which exposes or occludes to varying degrees the opening through the reservoir wall and so to accommodate different sized feed.

Figure 2:
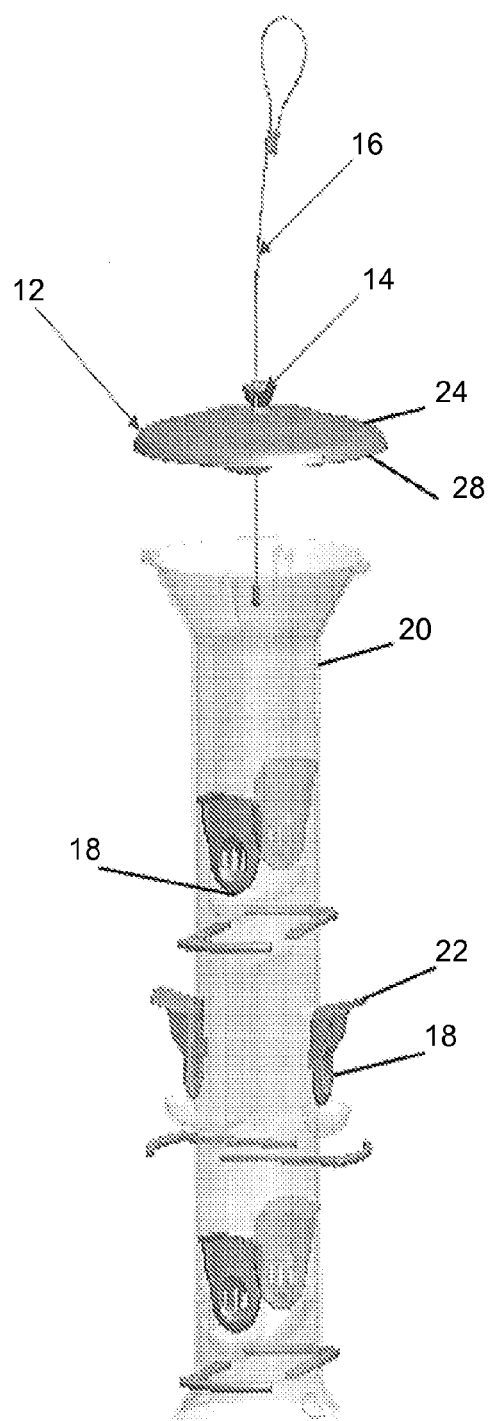
FIG. 2 is the bird feeder of FIG. 1 with the lid and knob assembly pulled upwardly along the suspending cable.
Figure 3:
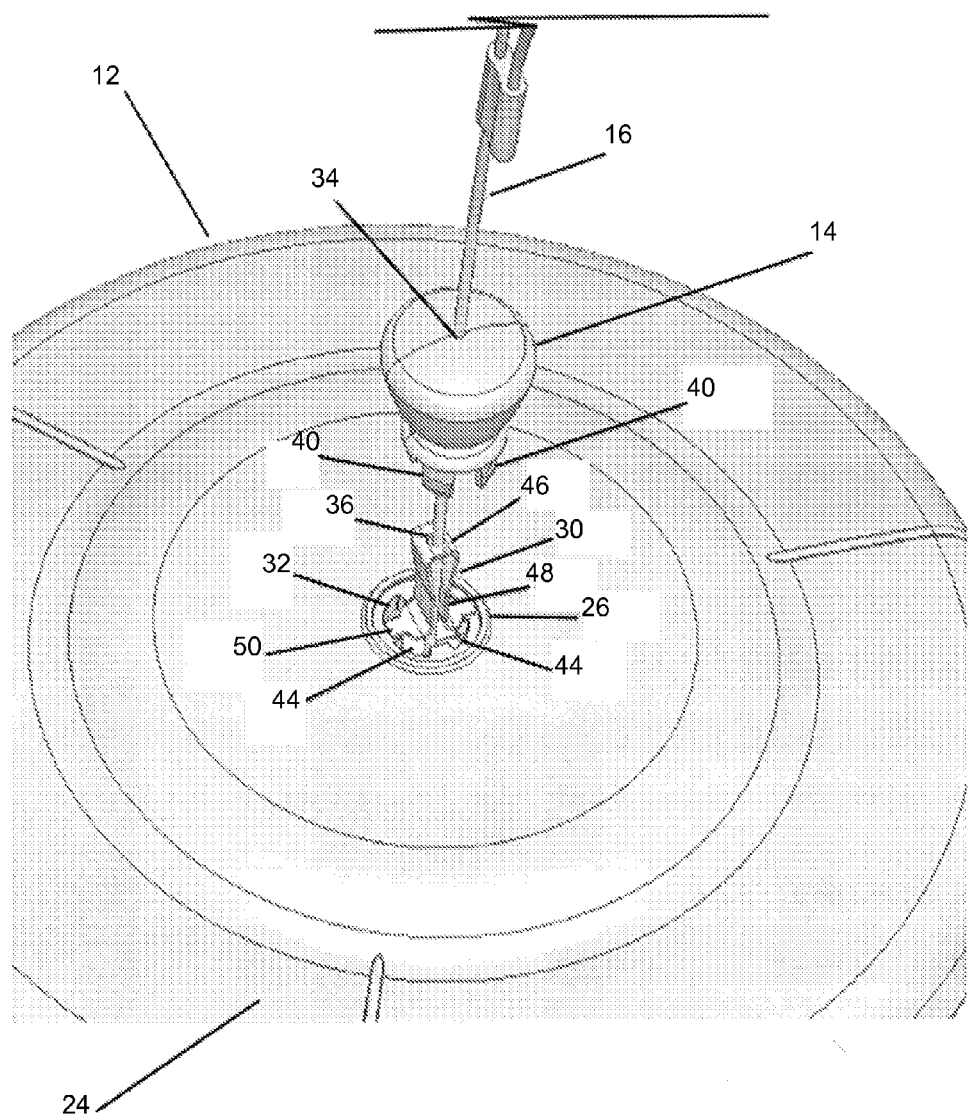
FIG. 3 is an enlarged exploded view of a portion of the lid, cable, and knob.
Figure 4:
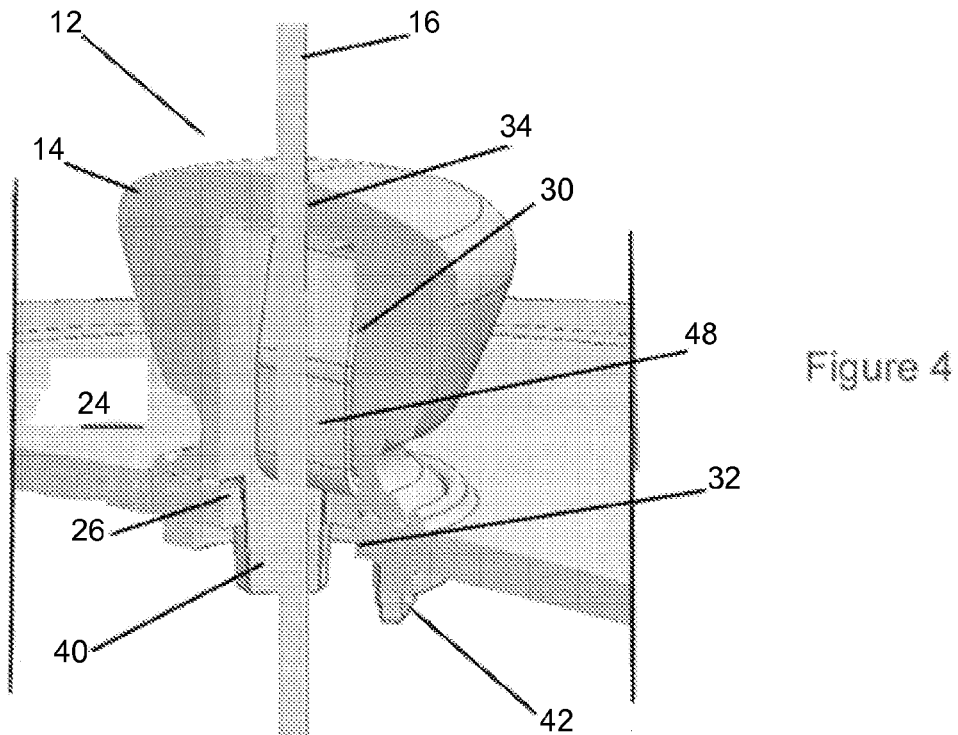
FIG. 4 is a vertical cross section through the lid, knob and cable.
Figure 5:
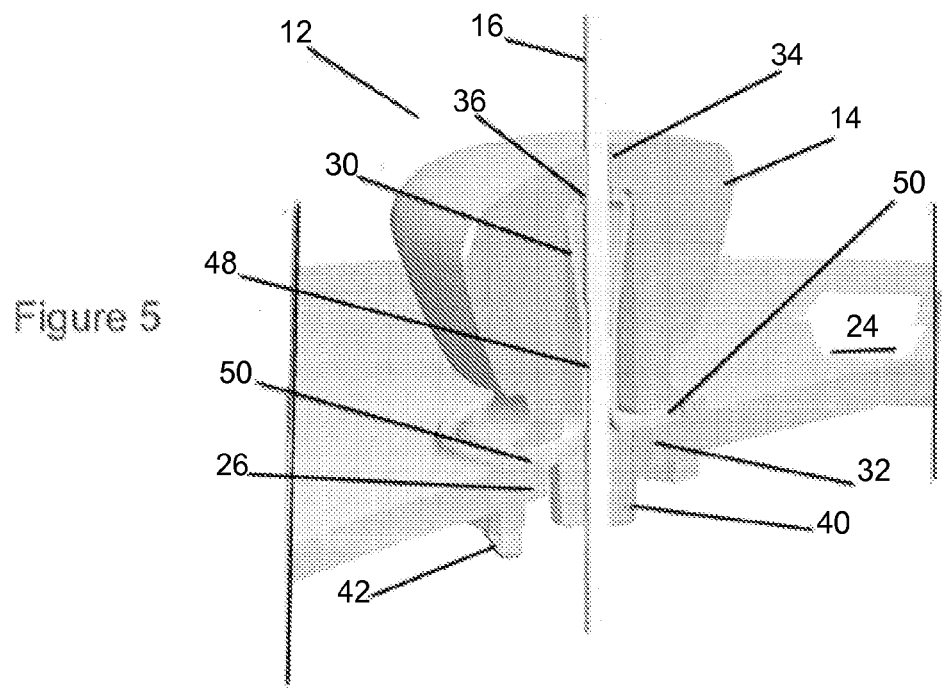
FIG. 5 is another vertical cross section taken at right angles to the cross section of FIG. 4.
Figure 6:
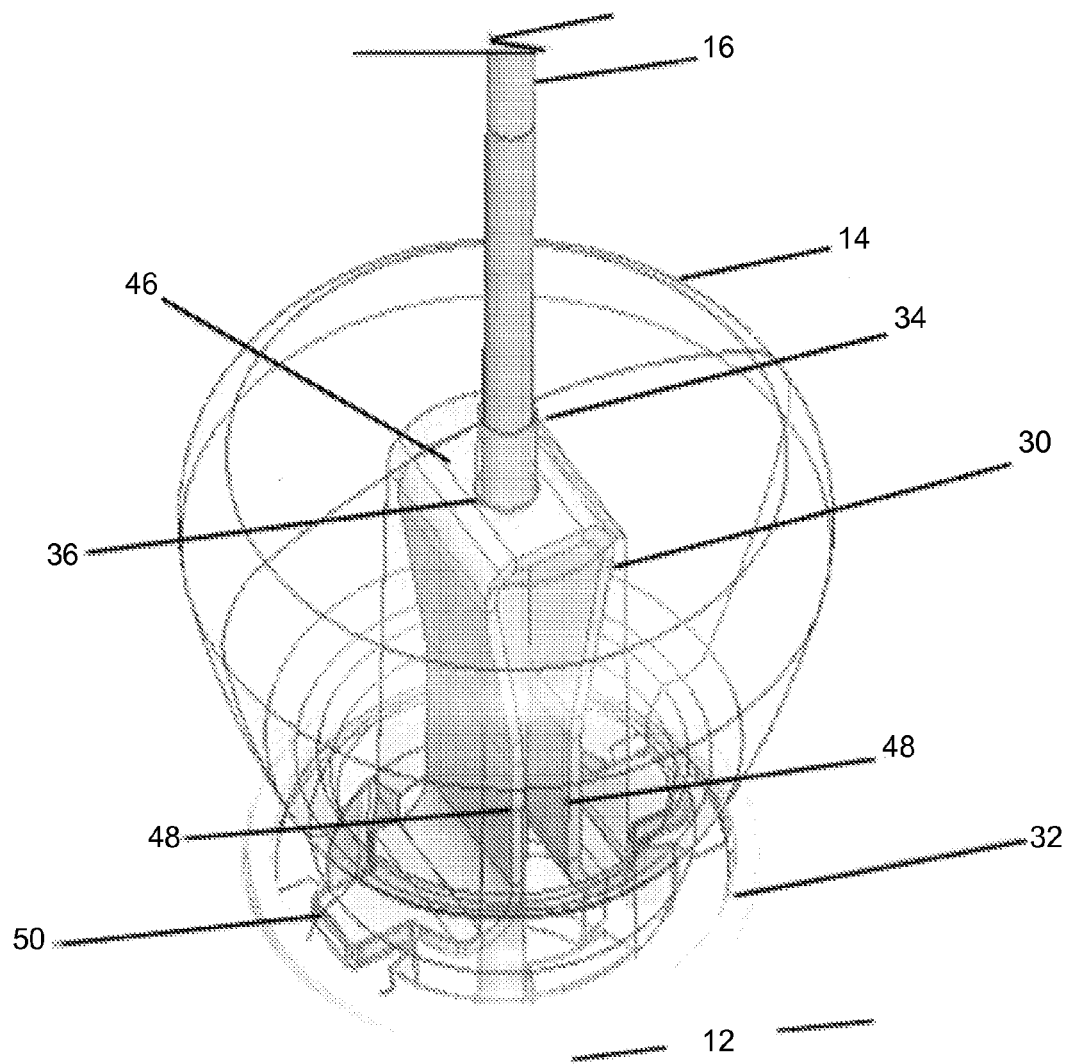
FIG. 6 shows the knob in phantom to better show the spring and cable.
Figure 7:
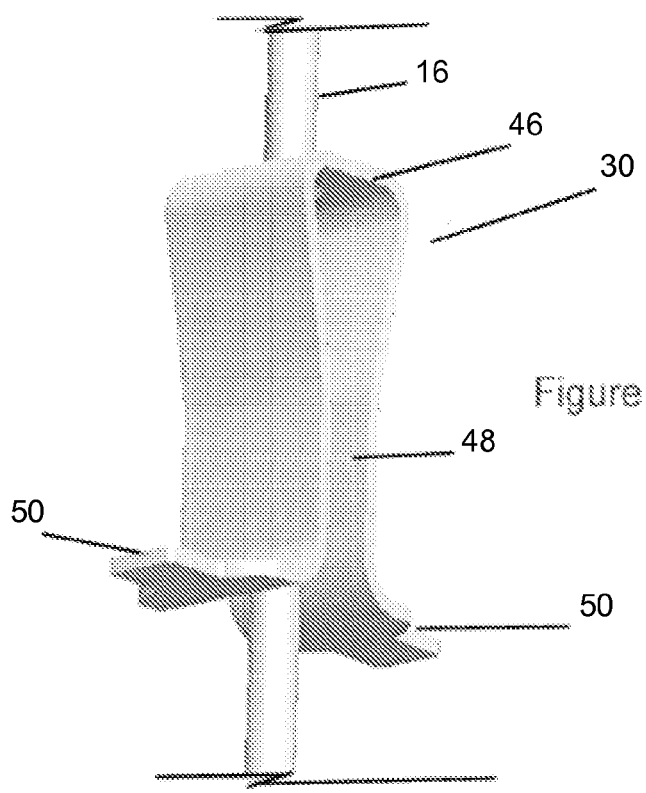
FIG. 7 is a perspective view of the spring gripping a portion of the cable.
Figure 8:
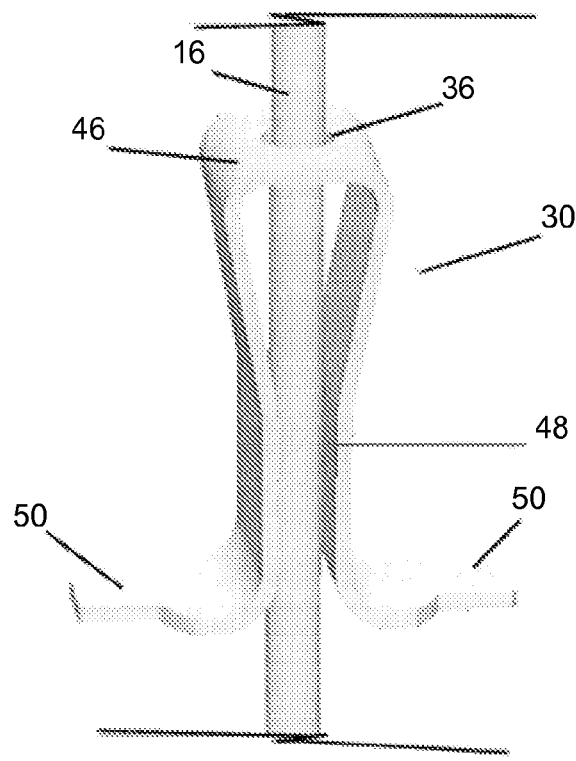
FIG. 8 is a view from the right side of FIG. 7.

The top or uppermost portion of the feed reservoir 20 is normally closed or occluded by a lid assembly 12. The lid 24 has a lip 28 which extends outwardly beyond the outermost wall of the reservoir. The lid is held to the top of the reservoir by a cable 16 which attaches to the reservoir and passes slidably through the lid and its centrally located knob 14. Thus the lid 24, the knob 14 and a spring (that will be described) each has a hole or passage for the cable 16 to attach to the reservoir 20 and extend upwardly to a tree limb or hook for suspending the bird feeder 10 in the outdoors. The lid assembly 12 has an especially configured gripping spring 30 that can slide along the length of the cable 16 when an adequate force is used to overcome frictional engagement between the lid assembly's spring and cable 16. FIG. 2 shows the lid being slid along the cable to expose the funnel shaped opening that accesses the interior of the feed reservoir.

Referring to FIG. 3 through 7, details of the lid assembly include the knob 14 which has an axial opening 34 extending vertically therethrough. The bottom edge of the knob is defined by four flexible bayonet fingers 40 each with a detent edge 42 gripping the correspondingly shaped receiver passage 44 that define the shape of an opening 32 through the center portion 26 of the lid.

The gripping spring 30 is a generally inverse U-shaped leaf spring or flat spring. The spring has a hole 36 in the bight portion 46 of the "U" sized to permit the cable 16 to easily pass through. Below this bight portion are two parallel inwardly facing surfaces 48 that are normally biased towards one another to grip the abutting opposite surfaces of the length of the cable. This spring is constructed of a thin, robust, tempered steel or bronze that maintains this gripping bias against the cable.

At the distal ends each of the spring's sides is an outwardly directed tang 50 that normally rests on an upwardly facing surface of the lid. Note that each of these tangs is positioned to rest on a protruding portion between correspondingly outwardly shaped portions of the receiver passage. Thus, when the knob 14 is in operative position locked onto the upper surface of the lid by the bayonet fingers 40, a pair of the bayonet fingers flank and hold the lateral sides of each of the tangs 50. Also the bayonet fingers, with their barbed edges 42 grip the under side of the lid and hold the spring captive between the facing surfaces of the knob and the upwardly facing surface of the lid.

Figure 9:
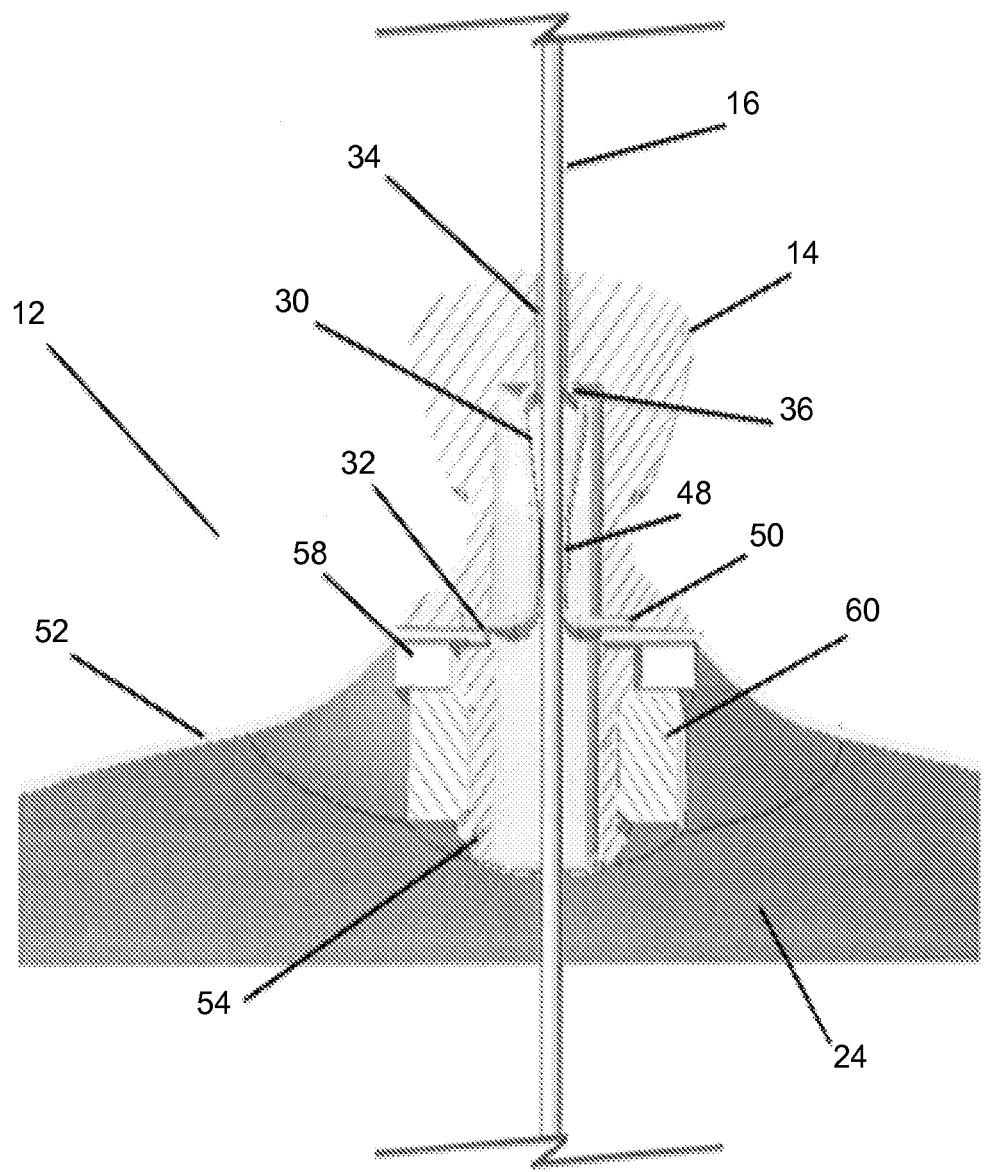
FIG. 9 is a vertical cross section through a second embodiment of the lid and knob combination.

FIG. 9 shows an alternative embodiment especially preferred when the lid 24 is made of a formed flat metal sheet 52. Here, instead of a bayonet connection between the knob 14 and the lid, the knob includes a threaded boss 54 which passes through a correspondingly sized hole 32 in the center portion 26 of the lid. This boss has two slots that receive the tangs 50 of the spring 30. Thus the spring is captive between the upper surface of the lid and an outwardly directed flange at the bottom of the knob. This assembly is held together by a washer 58 and nut 60 which is screwed onto the threaded boss 54 on the underside of the lid. The completed assembly defines a vertically extending passage for the cable 16 that runs up through the center of the lid, the threaded boss with its attaching washer and nut, up through and between the gripping portions of the spring 30, through the hole 36 in the bite portion 46 of the spring and finally out through the center bore of the knob. This alternative assembly function substantially the same as the assembly disclosed in at FIGS. 1 through 8.

The invention claimed is:

1. A lid assembly for a bird feeder comprising:
   a lid having an opening defined in a center portion of the lid, the opening extending through the lid;
   a cable slidably passing through the opening in the lid; and
   a gripping spring having a bight portion connecting a first arm to a second arm, the bite portion extending transverse to a length of the cable and having a hole defined therein, an inner surface of the first arm extending parallel to an opposing inner surface of the second arm, the cable passing from the opening in the lid between the first arm and the second arm through the hole in the bight portion, the inner surface biased towards the opposing inner surface to grip the cable.

2. The lid assembly of claim 1, wherein the center portion of the lid includes a receiver passage defining the opening in the lid.

3. The lid assembly of claim 2, wherein the first arm and the second arm each include a tang extending outwardly in a direction away from the cable, each of the tangs positioned on corresponding portions of the receiver passage.

4. The lid assembly of claim 1, further comprising:
   a knob positioned over the opening in the lid, the gripping spring positioned in a cavity of the knob, the cable passing through an opening in the knob positioned over the hole in the bight portion of the gripping spring.

5. The lid assembly of claim 4, wherein the knob includes at least one bayonet finger having a detent edge configured to engage a receiver passage defining the opening in the lid.

6. The lid assembly of claim 5, wherein the first arm and the second arm each include a tang extending outwardly in a direction away from the cable, the at least one bayonet finger configured to hold a lateral side of one of the tangs.

7. The lid assembly of claim 4, wherein the knob includes a threaded boss extending through the opening in the lid.

8. The lid assembly of claim 7, wherein the first arm and the second arm each include a tang extending outwardly in a direction away from the cable, the boss including a slot configured to receive and engage one of the tangs.

9. The lid assembly of claim 8, wherein the threaded boss is fixed to the lid with a washer and a nut.

10. The lid assembly of claim 1, wherein the gripping spring is constructed of a thin, robust, tempered metal.

11. The lid assembly of claim 1, wherein the bight portion, the first arm, and the second arm generally form a U-shape.

12. A bird feeder comprising:
    a lid having an opening defined in a center portion of an upwardly facing surface, the opening extending through the lid;
    a knob mounted on the upwardly facing surface of the lid, the knob including an opening into a cavity positioned over the lid opening in the lid;
    a gripping spring disposed in a cavity of a knob, the gripping spring including a bight portion connecting a first arm to a second arm, the bight portion having a hole positioned relative to the opening in the knob over the opening in the lid, the first arm having an inner surface extending parallel to an opposing inner surface of the second arm; and
    a cable slidably passing through the opening in the lid between the inner surface and the opposing inner surface and through the hole in the bight portion and the opening in the knob, the inner surface and the opposing inner surface having a biased grip on the cable.

13. The bird feeder of claim 12, wherein the lid is configured to removably engage a top portion of a reservoir to occlude an opening into the reservoir.

14. The bird feeder of claim 13, wherein the cable is attached to the reservoir and extends through the opening in the reservoir into the opening in the lid.

15. The bird feeder of claim 13, wherein the biased grip of the inner surface and the opposing inner surface on the cable permits the lid to move between a closed position where the lid occludes the opening into the reservoir and an open position where the lid allows access to the opening into the reservoir.

16. A bird feeder comprising:
    a reservoir configured to hold a supply of bird food, the reservoir including an opening at a top portion;
    a lid configured to removably engage the top portion of the reservoir to occlude the opening into the reservoir, the lid having an opening defined in a center portion of an upwardly facing surface, the opening extending through the lid;
    a gripping spring disposed in the cavity of the knob, the gripping spring including a bight portion connecting a first arm to a second arm, the bight portion having a hole positioned relative to the opening in the knob over the opening in the lid, the first arm having an inner surface extending parallel to an opposing inner surface of the second arm; and
    a cable attached to the reservoir and slidably passing through the opening in the lid between the inner surface and the opposing inner surface and through the hole in the bight portion and the opening in the knob, the inner surface and the opposing inner surface having a biased grip on the cable.

17. The bird feeder of claim 16, wherein the bight portion, the first arm, and the second arm generally form a U-shape.

18. The bird feeder of claim 16, wherein the gripping spring is constructed of a thin, robust, tempered metal.

19. The bird feeder of claim 16, wherein the biased grip of the inner surface and the opposing inner surface on the cable permits the lid to move between a closed position where the lid occludes the opening into the reservoir and an open position where the lid allows access to the opening into the reservoir.

20. The bird feeder of claim 16, further comprising:
at least one feeding station positioned relative to an opening in a wall of the reservoir.

\* \* \* \* \*